United States Patent
Tanaka (10) Patent No.: US 10,291,875 B2
(45) Date of Patent: May 14, 2019

(54) SIGNAL PROCESSING APPARATUS AND METHOD OF GENERATING AUDIO SIGNAL

(71) Applicant: CANON KABUSHIKI KAISHA, Tokyo (JP)

(72) Inventor: Katsumasa Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/826,038

(22) Filed: Nov. 29, 2017

(65) Prior Publication Data

US 2018/0152660 A1 May 31, 2018

(30) Foreign Application Priority Data

Nov. 30, 2016 (JP) ................................. 2016-233499

(51) Int. Cl.
| | | |
|---|---|---|
| *H04N 5/04* | (2006.01) |
| *H04N 5/60* | (2006.01) |
| *H04N 5/232* | (2006.01) |
| *H04N 5/247* | (2006.01) |
| *H04N 5/268* | (2006.01) |

(52) U.S. Cl.
CPC ................ *H04N 5/60* (2013.01); *H04N 5/04* (2013.01); *H04N 5/232* (2013.01); *H04N 5/247* (2013.01); *H04N 5/268* (2013.01)

(58) Field of Classification Search
CPC ........... H04N 5/60; H04N 5/247; H04N 5/268
See application file for complete search history.

(56) References Cited

U.S. PATENT DOCUMENTS

| | | | | |
|---|---|---|---|---|
| 2012/0141016 A1* | 6/2012 | Wildeboer | ........... | H04N 13/271 382/154 |
| 2013/0070047 A1* | 3/2013 | DiGiovanni | ........... | H04N 5/222 348/36 |
| 2013/0125000 A1* | 5/2013 | Fleischhauer | ........ | G11B 27/031 715/723 |

FOREIGN PATENT DOCUMENTS

JP 2016-025633 A 2/2016

* cited by examiner

*Primary Examiner* — Michael E Teitelbaum
(74) *Attorney, Agent, or Firm* — Carter, DeLuca & Farrell LLP (57) ABSTRACT

A signal processing apparatus: specifies a capture time of a plurality of captured images that are captured from respectively different directions by a plurality of cameras in order to generate a virtual-viewpoint image corresponding to a designated virtual viewpoint; obtain an audio collection signal based on collection of audio of an audio collection target region by a microphone, wherein the audio collection target region includes at least a part of a capturing range of the plurality of cameras; generates an audio signal to be reproduced together with the virtual-viewpoint image corresponding to the capture time specified by the specification unit, by using the obtained audio collection signal based on collection by the microphone at a point in time prior to the specified capture time.

20 Claims, 9 Drawing Sheets

SIGNAL PROCESSING APPARATUS AND METHOD OF GENERATING AUDIO SIGNAL

BACKGROUND OF THE INVENTION

Field of the Invention

The present invention relates to a signal processing apparatus and a method for generating audio signal corresponding to image content.

Description of the Related Art

A technique in which a plurality of cameras are installed at differing positions, synchronous capture is performed thereby at multiple viewpoints, and virtual-viewpoint content is generated by using the multi-view images obtained by the capturing is gaining attention. By virtue of this technique for generating virtual-viewpoint content from multi-view images, because it is possible to view a highlight scene of a soccer or basketball game from various angles, it is possible to provide more of a sense of presence to a user than with normal images for example. Also, causing sound volume to change in accordance with the focus of the image in a case where images and audio are reproduced simultaneously is known (patent document 1).

[Patent document 1] Japanese Patent Laid-Open No. 2016-025633

Virtual-viewpoint content may be still image virtual-viewpoint content generated from images that a plurality of cameras captured at one time and may be moving image virtual-viewpoint content generated from images that a plurality of cameras captured in a fixed period. Both still image virtual-viewpoint content and moving image virtual-viewpoint content are handled as multi-viewpoint moving images involving a switching of virtual viewpoints when viewing, and provide a user an enhanced sense of presence.

However, in conventional techniques, there are cases where it is not possible to provide the user with a sense of presence for audio in the reproduction of the virtual-viewpoint content. For example, the still image virtual-viewpoint content is generated from images captured at one time, and thus there is no audio corresponding to the reproduction period. As a result, it is silent during playback of the still image virtual-viewpoint content or the audio becomes out of sync with the image after reproduction of the still image virtual-viewpoint content, and not only it is not possible to provide the user with a sense of presence, the user is left with a sense of unnaturalness.

SUMMARY OF THE INVENTION

By virtue of an embodiment of the present invention, a signal processing apparatus and a signal processing method by which it is possible to provide audio content relating to image content at a virtual viewpoint are disclosed.

According to one aspect of the present invention, there is provided a signal processing apparatus, comprising: a specification unit configured to specify a capture time of a plurality of captured images that are captured from respectively different directions by a plurality of cameras in order to generate a virtual-viewpoint image corresponding to a designated virtual viewpoint; an obtainment unit configured to obtain an audio collection signal based on collection of audio of an audio collection target region by a microphone, wherein the audio collection target region includes at least a part of a capturing range of the plurality of cameras; and a generation unit configured to generate an audio signal to be reproduced together with the virtual-viewpoint image corresponding to the capture time specified by the specification unit, by using the audio collection signal based on collection by the microphone at a point in time prior to the specified capture time, the audio collection signal being obtained by the obtainment unit.

According to another aspect of the present invention, there is provided a method of generating an audio signal, comprising: specifying a capture time of a plurality of captured images that are captured from respectively different directions by a plurality of cameras in order to generate a virtual-viewpoint image corresponding to a designated virtual viewpoint; obtaining an audio collection signal based on collection of audio of an audio collection target region by a microphone, wherein the audio collection target region includes at least a part of a capturing range of the plurality of cameras; and generating an audio signal to be reproduced together with the virtual-viewpoint image corresponding to the specified capture time, by using the obtained audio collection signal, wherein the audio collection signal is based on collection by the microphone at a point in time prior to the specified capture time.

According to another aspect of the present invention, there is provided a non-transitory computer-readable storage medium storing a program for causing a computer to execute a method of generating an audio signal, the method comprising: specifying a capture time of a plurality of captured images that are captured from respectively different directions by a plurality of cameras in order to generate a virtual-viewpoint image corresponding to a designated virtual viewpoint; obtaining an audio collection signal based on collection of audio of an audio collection target region by a microphone, wherein the audio collection target region includes at least a part of a capturing range of the plurality of cameras; and generating an audio signal to be reproduced together with the virtual-viewpoint image corresponding to the specified capture time, by using the obtained audio collection signal, wherein the audio collection signal is based on collection by the microphone at a point in time prior to the specified capture time.

Further features of the present invention will become apparent from the following description of exemplary embodiments (with reference to the attached drawings).

DESCRIPTION OF THE EMBODIMENTS

Hereinafter, referring to the attached drawings, embodiments of the present invention will be described in detail.

First Embodiment

In the first embodiment, description is given regarding an operation for performing a determination of the time of the audio to be used and the processing to be executed in a case where audio content is generated. In the first embodiment, it is assumed that there are types of image content that can be generated: still image virtual-viewpoint content, moving image virtual-viewpoint content, and live image content. The live image content is image content used in a live broadcast, and is image content for which one selected camera image is used from among a plurality of cameras at each time. The moving image virtual-viewpoint content is a moving image generated based on multi-viewpoint images (a plurality of captured images) captured by a plurality of cameras in a predetermined period from differing directions respectively, and corresponding to an arbitrarily designated virtual viewpoint. The still image virtual-viewpoint content is a moving image generated based on multi-viewpoint images captured by a plurality of cameras at a single point in time from directions different to each other, and corresponds to a virtual viewpoint that changes in the period of the moving image. In the embodiment hereinafter, a single virtual-viewpoint image is recited in a case where there is no distinction between moving image virtual-viewpoint content and still image virtual-viewpoint content.

Meanwhile, in the present embodiment, there exist two types of audio content that can be generated: virtual surround sound content and live audio content. The virtual surround sound content is audio content that applies pseudo-surround sound effect processing by using information such as a position of an object in the image content or a position from which a camera captures. The live audio content is audio content used in a live broadcast, and is 2ch audio content generated based on audio data collected from two selected microphones, for example.

[Device Configuration and Processing of Each Block]

Figure 1A:
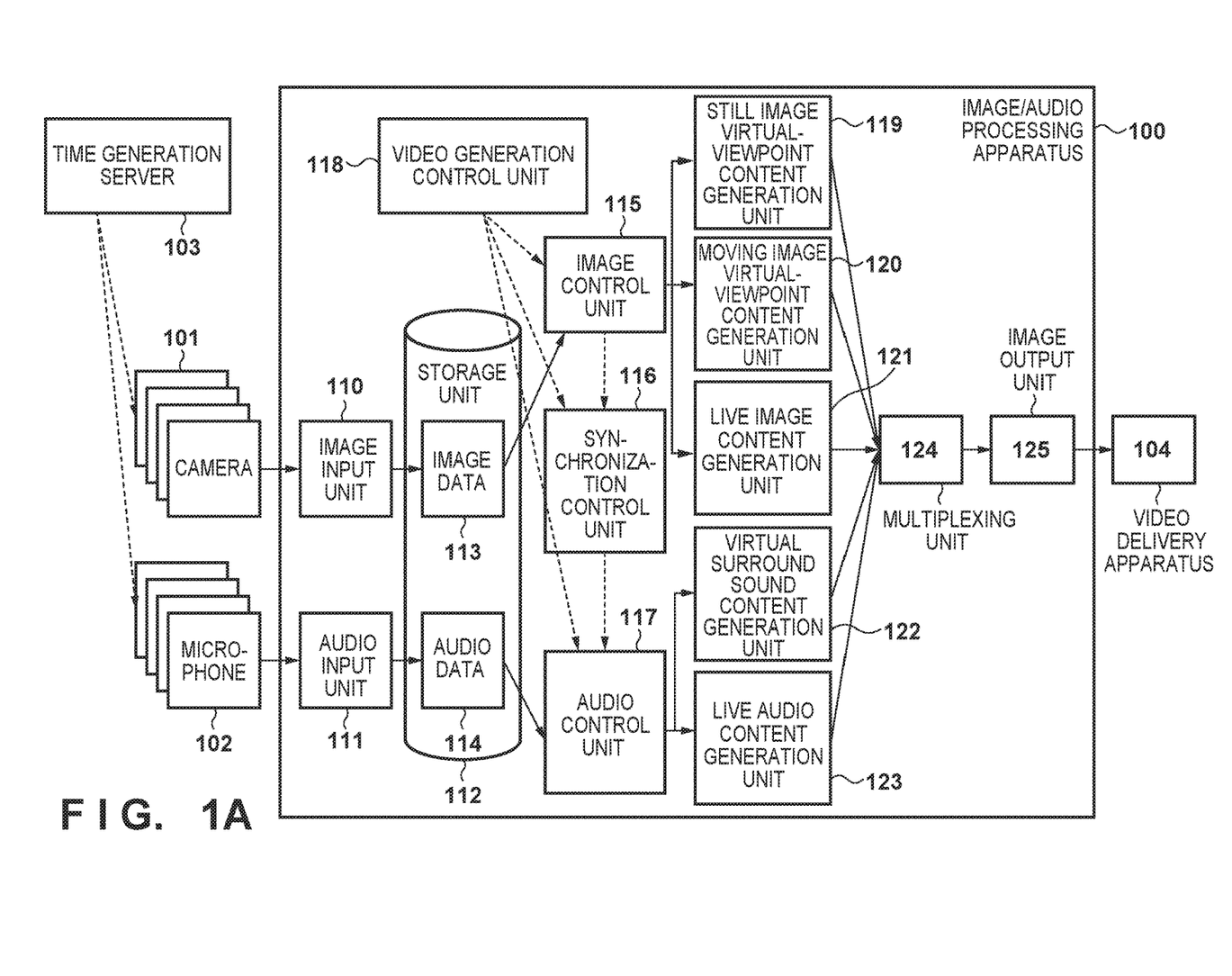
FIG. 1A is a block diagram illustrating an example of a device configuration of a video processing system according to a first embodiment.

FIG. 1A is a block diagram illustrating an example of a device configuration of a video processing system according to a first embodiment. A video processing system is equipped with an image/audio processing apparatus 100, a camera group 101, a microphone group 102, a time generation server 103, and a video delivery apparatus 104. The image/audio processing apparatus 100 receives a number of pieces of image data (captured images) according to the number of cameras from the camera group 101 and a number of pieces of audio data (sound pickup signal) according to the number of microphones from the microphone group 102.

The camera group 101 is configured by a plurality of cameras for capturing objects from a plurality of directions. The microphone group 102 is configured by a plurality of microphones. In the present embodiment, an audio collection target region in which the microphone group 102 performs audio collection includes at least a portion of a capturing range of the camera group 101. The time generation server 103 generates time information, and sends it to the camera group 101 and the microphone group 102. The cameras and microphones that configure the camera group 101 and the microphone group 102 receive time information from the time generation server 103, append the time information to images and audio, and then send them to the image/audio processing apparatus 100. Note, configuration may be taken such that the time generation server 103 sends the time information to the image/audio processing apparatus 100, and the image/audio processing apparatus 100 appends the time information to the images and the audio.

Next, description regarding the configuration of the image/audio processing apparatus 100 is given. An image input unit 110 accepts input of the images that the camera group 101 captured to obtain the images, and transfers them to a storage unit 112. An audio input unit 111 obtains audio (audio collection signal) that the microphone group 102 collected, and transfers it to the storage unit 112. The storage unit 112 stores the image data obtained from the image input unit 110 (the image data obtained by the plurality of cameras of the camera group 101) and audio data that the audio input unit 111 obtained (the audio data obtained by the plurality of microphones of the microphone group 102). The images and audio stored in the storage unit 112 are referred to as image data 113 and audio data 114 respectively. A video generation control unit 118 transfers instructions and setting values of a user relating to generation of video content to an image control unit 115, a synchronization control unit 116, and an audio control unit 117. Note, in the present specification, video content is assumed to be content including image content and audio content to be reproduced together with the image content.

The image control unit 115 determines the type of the generated image content based on the image data 113 in accordance with an instruction by the video generation control unit 118. In a case where still image virtual content is generated, the image control unit 115 transfers image data 113 read from the storage unit 112 to a still image virtual-viewpoint content generation unit 119. In a case where moving image virtual-viewpoint content is generated, the image control unit 115 transfers image data 113 read from the storage unit 112 to a moving image virtual-viewpoint content generation unit 120. In a case where live image content is generated, the image control unit 115 transfers image data 113 read from the storage unit 112 to a live image content generation unit 121. Also, the image control unit 115 transfers the above described type of generated image content, time information of the read image data, and the like to the synchronization control unit 116.

The synchronization control unit 116 obtains the type of image content, a time stamp of the image data 113, a start time of image content generation, object coordinates of the image data 113, and the like from the image control unit 115 or the video generation control unit 118, and transfers these to the audio control unit 117. The audio control unit 117, based on either or both of an instruction from the video generation control unit 118 and a determination within the audio control unit 117 based on information obtained from the synchronization control unit 116, determines the type of the audio content to be generated and the type of the audio data to be used. In a case where virtual surround sound content is generated, the audio control unit 117 transfers audio data 114 read from the storage unit 112 to a virtual surround sound content generation unit 122. In a case where live audio content is generated, the audio control unit 117 transfers audio data 114 read from the storage unit 112 to a live audio content generation unit 123.

The still image virtual-viewpoint content generation unit 119 generates still image virtual-viewpoint content by using the image data 113 obtained from the image control unit 115, and transfers it to a multiplexing unit 124. The moving image virtual-viewpoint content generation unit 120 generates moving image virtual-viewpoint content by using the image data 113 obtained from the image control unit 115, and transfers it to the multiplexing unit 124. The live image content generation unit 121 generates live image content by using the image data 113 obtained from the image control unit 115, and transfers it to the multiplexing unit 124. The virtual surround sound content generation unit 122 generates virtual surround sound content by using the audio data 114 obtained from the audio control unit 117, and transfers it to the multiplexing unit 124. The live audio content generation unit 123 generates live audio content by using the audio data 114 obtained from the audio control unit 117, and transfers it to the multiplexing unit 124.

The multiplexing unit 124 and an image output unit 125 execute control for causing the audio content to be reproduced together with the image content. The multiplexing unit 124 obtains image content from the still image virtual-viewpoint content generation unit 119, the moving image virtual-viewpoint content generation unit 120, and the live image content generation unit 121. Also, the multiplexing unit 124 obtains the audio content from the virtual surround sound content generation unit 122 and the live audio content generation unit 123. Then, the multiplexing unit 124 multiplexes the image content and the audio content into one data sequence to generate video content, and outputs the video content to the image output unit 125. The image output unit 125 outputs the video content obtained from the multiplexing unit 124 to the video delivery apparatus 104.

Figure 1B:
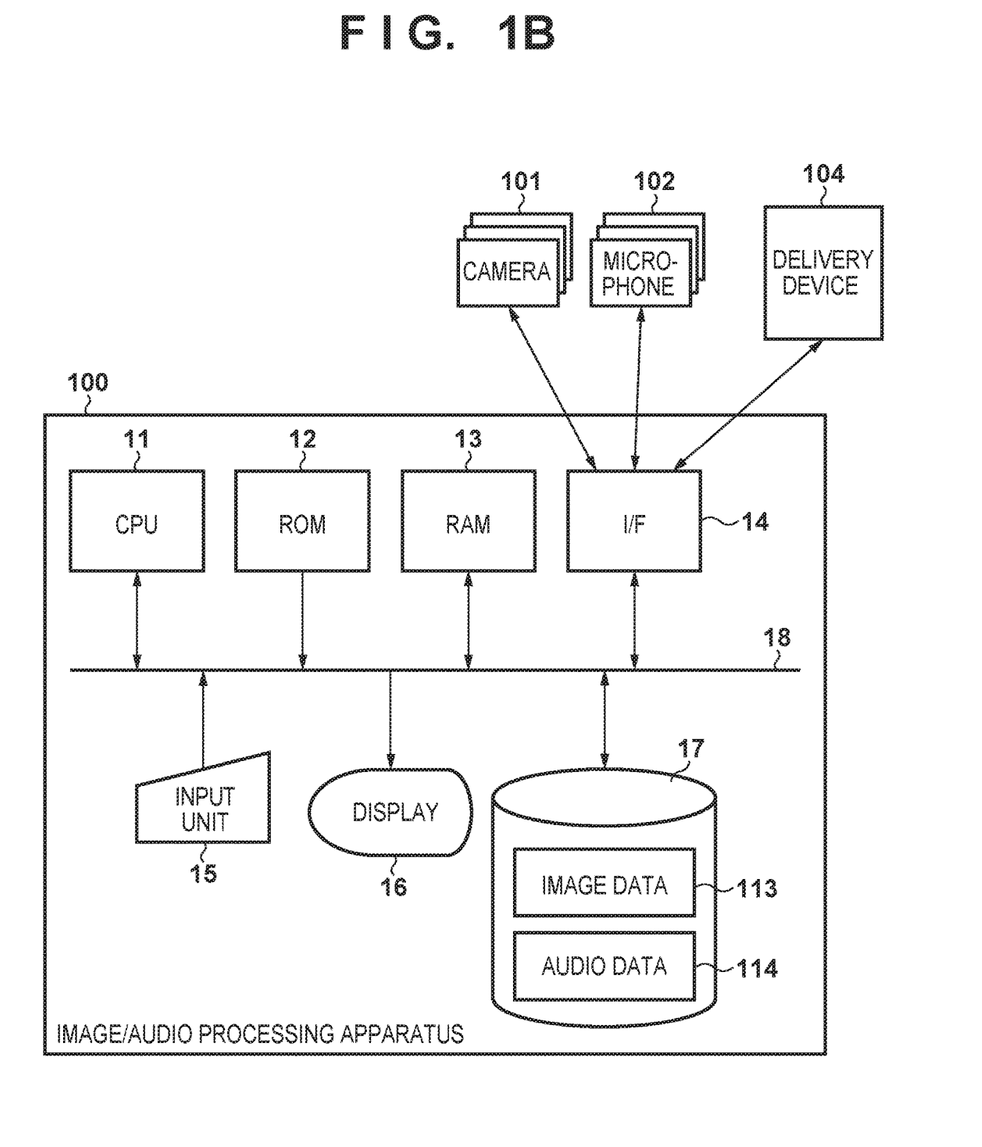
FIG. 1B is a block diagram illustrating an example of a hardware configuration of an image/audio processing apparatus.

FIG. 1B is a view illustrating an example of the hardware configuration of the image/audio processing apparatus 100 according to the first embodiment. A CPU 11 realizes the above described functional units by executing programs held in a ROM 12 which is a read-only memory or in a readable/writable RAM 13 as necessary. An interface 14 connects the image/audio processing apparatus 100 to an external device such as the camera group 101, the microphone group 102, or the video delivery apparatus 104. An input unit 15 accepts various input by the user. A display unit 16 is a liquid crystal display for example, and performs various display under the control of the CPU 11. A storage apparatus 17 is configured by a hard disk drive, for example, and realizes the storage unit 112. Also, the storage apparatus 17 stores various programs, and necessary programs are appropriately loaded to the RAM 13 for execution by the CPU 11. The above described configurations are connected via an internal bus 18 so as to be able to communicate with each other.

[Operation]

Figure 2:
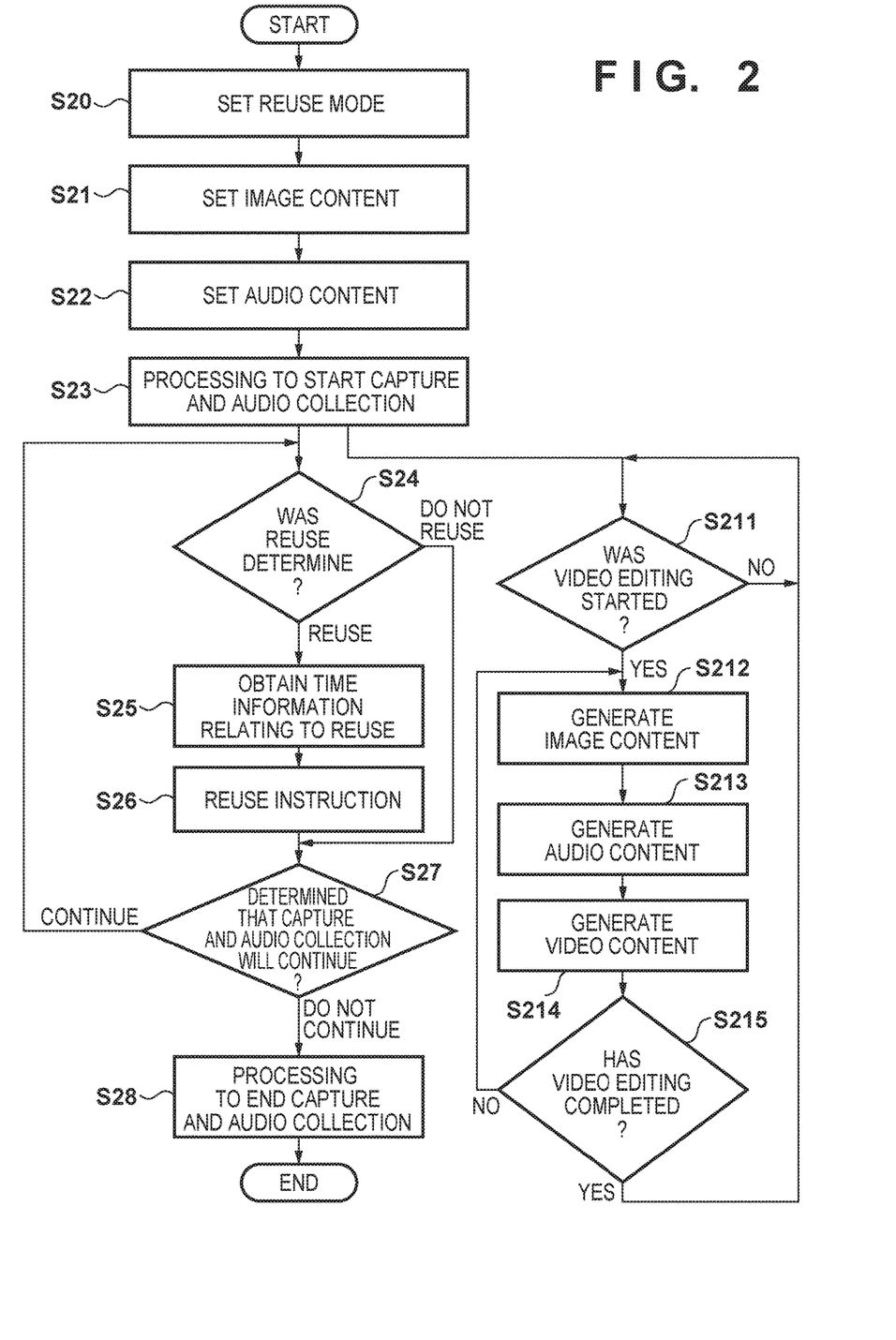
FIG. 2 is a flowchart illustrating image/audio processing according to the first embodiment.

Description is given regarding operation of the image/audio processing apparatus 100 equipped with the above configurations. FIG. 2 is a flowchart for describing image/audio processing according to the first embodiment. In the present embodiment, audio content reproduced together with image content is generated by using previous audio data which is audio data collected at a time prior to the capturing time corresponding to image content of a virtual viewpoint generated based on image data. Note, in the present embodiment, image content for a virtual viewpoint with which audio content generated by using previous audio data is associated is still image virtual-viewpoint content.

In step S20, the video generation control unit 118 sets a reuse mode with respect to the audio control unit 117. In the present embodiment, three types of reuse modes can be set: a user instruction mode, an automatic-time-stamp-determination mode, and an automatic-content-determination mode. Note, the reuse mode is designated by the user via a predetermined user interface (the input unit 15). Configuration may be taken such that the reuse mode can be set again at any time. Specific operation of each mode is described later using FIG. 3. Also, the mode is not necessarily limited to reused data because all of the audio data 114 is targeted. In other words, a case in which audio data that was not used in the past is used is also possible.

In step S21, the video generation control unit 118 performs an image content setting with respect to the image control unit 115. The type of content to be generated, the time at which generation is to start, the time at which generation is to end, setting values for the camera group 101, and the like are included in the image content setting. Note, the image content setting is also conveyed to the synchronization control unit 116. In step S22, the video generation control unit 118 performs an audio content setting with respect to the audio control unit 117. The number of channels of the content to be generated, the setting values of the microphone group 102, and the like are included in the audio content setting.

In step S23, the video generation control unit 118 instructs a start of image capturing and audio collection to the camera group 101, the microphone group 102, and the image/audio processing apparatus 100. By this instruction, storage of images that the image input unit 110 receives from the camera group 101 to the storage unit 112 and storage of audio that the audio input unit 111 receives from the microphone group 102 to the storage unit 112 is started.

Step S211 to step S215 are editing processes for generating video content including image content and audio content by using the image data 113 and the audio data 114 stored in the storage unit 112. When a start of video editing is instructed, the video generation control unit 118 starts video editing processing (step S211, YES). The video editing processing includes generation of image content by the image control unit 115 (step S212), generation of audio content by the audio control unit 117 (step S213), and generation of video content by the multiplexing unit 124 (step S214). In the generation of the image content, the image control unit 115 reads, from the storage unit 112, image data to be used in the generation of the image content, and transfers the image data to one of the content generation units 119 to 121 in accordance with the type of the image content that the user designated. In the generation of the audio content, the audio control unit 117 reads, from the storage unit 112, the audio data specified based on a time stamp of the image data used in the generation of the image content, and transfers it to one of the content generation units 122 to 123. In the generation of the video content, the multiplexing unit 124 multiplexes into a single data sequence and outputs the image content and the audio content accepted from respective content generation units. The user can immediately view/listen to the video content as an editing result. Until there is an instruction to end the editing by the user, the processing of step S212 to step S214 repeats (step S215).

Figure 4:
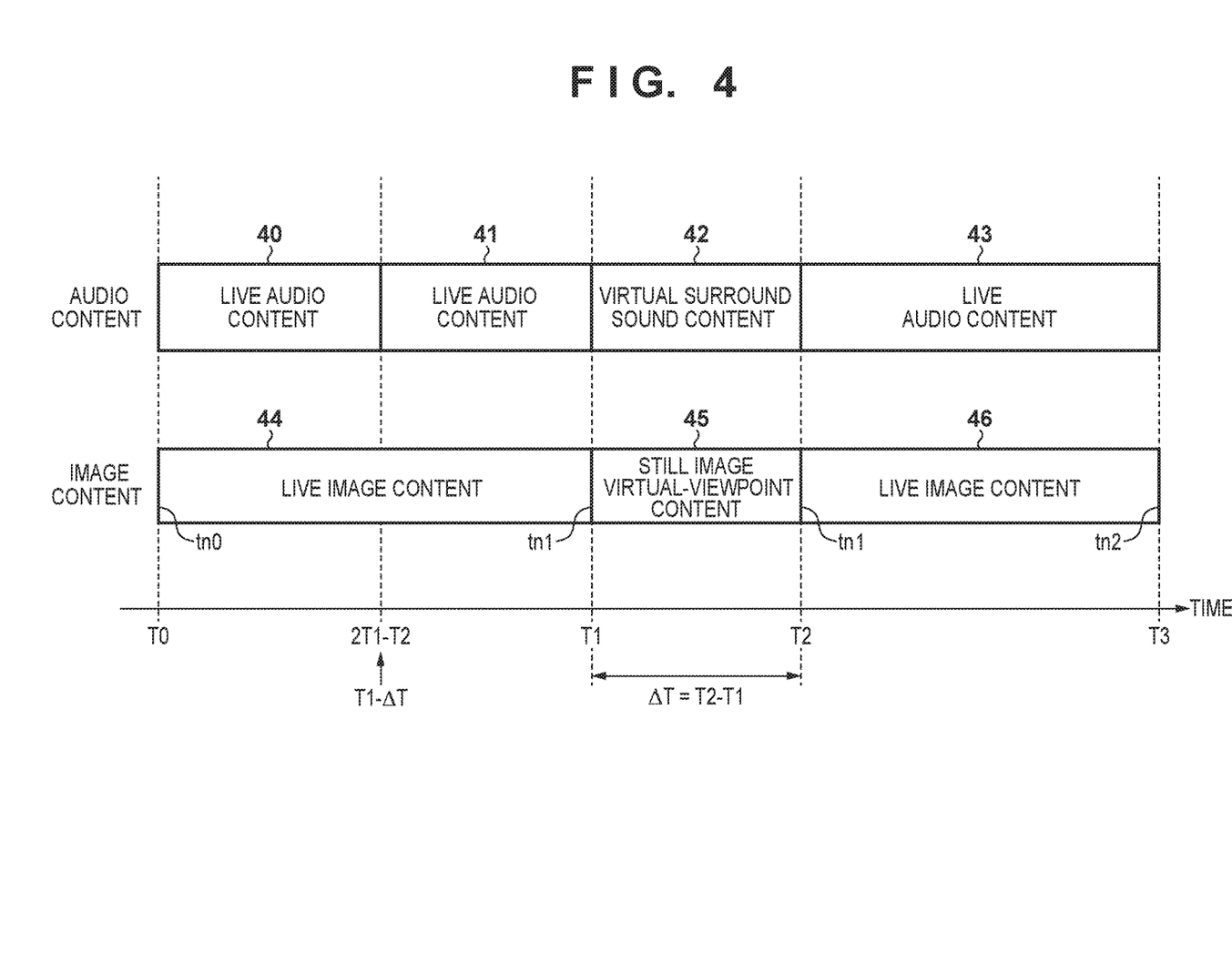
FIG. 4 is a view of a correlation between audio and images for each time according to the first embodiment.

For example, in FIG. 4, the user generates image content by reproducing image data from a time stamp tn0. Meanwhile, the image data is transferred to the live image content generation unit 121, and live image content is generated thereby. When an image of time stamp tn1 (time T1) is reproduced, a user performs a pause, a still image is displayed, and then the viewpoint is caused to move. Meanwhile, necessary image data is transferred to the still image virtual-viewpoint content generation unit 119, and still image virtual-viewpoint content is generated thereby. After this, when the moving image reproduction (the time T2) is resumed, images from the time stamp tn1 onwards are reproduced and live image content is generated. When the video editing is ended when the image of the time stamp tn2 is reproduced (time T3), image content of a configuration as illustrated in FIG. 4 is generated. Specifically, the image content illustrated in FIG. 4 includes a period in which a virtual-viewpoint image is reproduced and a period in which a captured image that is captured by a camera is reproduced.

In the generation of the audio content reproduced together with the image content as described above, the audio control unit 117 normally selects audio used in the generation of the audio content based on time stamps of the images. For example, the audio control unit 117 generates live audio content 40 and 41 as audio data corresponding to live image content 44 (FIG. 4). At that time, the audio control unit 117 generates audio content by sending audio data corresponding to the image data used in the generation of the live image content 44 to the live audio content generation unit 123. In a case of the still image virtual-viewpoint content, audio for generating audio content is not obtained because there is only one time stamp. Accordingly, the audio control unit 117 generates audio content for the still image virtual content by sending a reuse instruction to the virtual surround sound content generation unit 122.

Step S24 to step S26 are processes by which the audio control unit 117 outputs such a reuse instruction to the virtual surround sound content generation unit 122. The processing of step S24 to step S26 can be executed substantially in parallel with the processing of step S211 to step S215. In step S24, the audio control unit 117 determines whether or not to reuse audio data in accordance with the reuse mode setting that the video generation control unit 118 set in step S20. Description regarding the details of step S24 is given later with reference to the flowchart of FIG. 3. In a case where it is determined that audio data will be reused, the audio control unit 117, in step S25, specifies an image content start time and a reproduction period for the image content necessary for reuse by obtaining them from the synchronization control unit 116. Then, in step S26, the audio control unit 117 transfers the audio data, the start time of the image content, and the reproduction period of the image content to the virtual surround sound content generation unit 122. In this step, the audio control unit 117 may convey to the video generation control unit 118 that the instruction completed. In a case where it is determined in step S24 that audio data will not be reused, the above described step S25 and step S26 are skipped. Also, because audio data reuse is executed during the reproduction period obtained in step S25, the processing enters a standby state over this reproduction period in step S26, and the processing returns to step S24 when the reproduction period has elapsed.

In step S27, the video generation control unit 118 confirms an instruction of the user in order to determine whether to continue image capturing and audio collection. In a case where the image capturing and audio collection is to be continued, the processing returns to step S24, and in a case where the image capturing and audio collection is not to be continued, the processing advances to step S28. In step S28, the video generation control unit 118 performs processing to end image capturing and audio collection.

Figure 3:
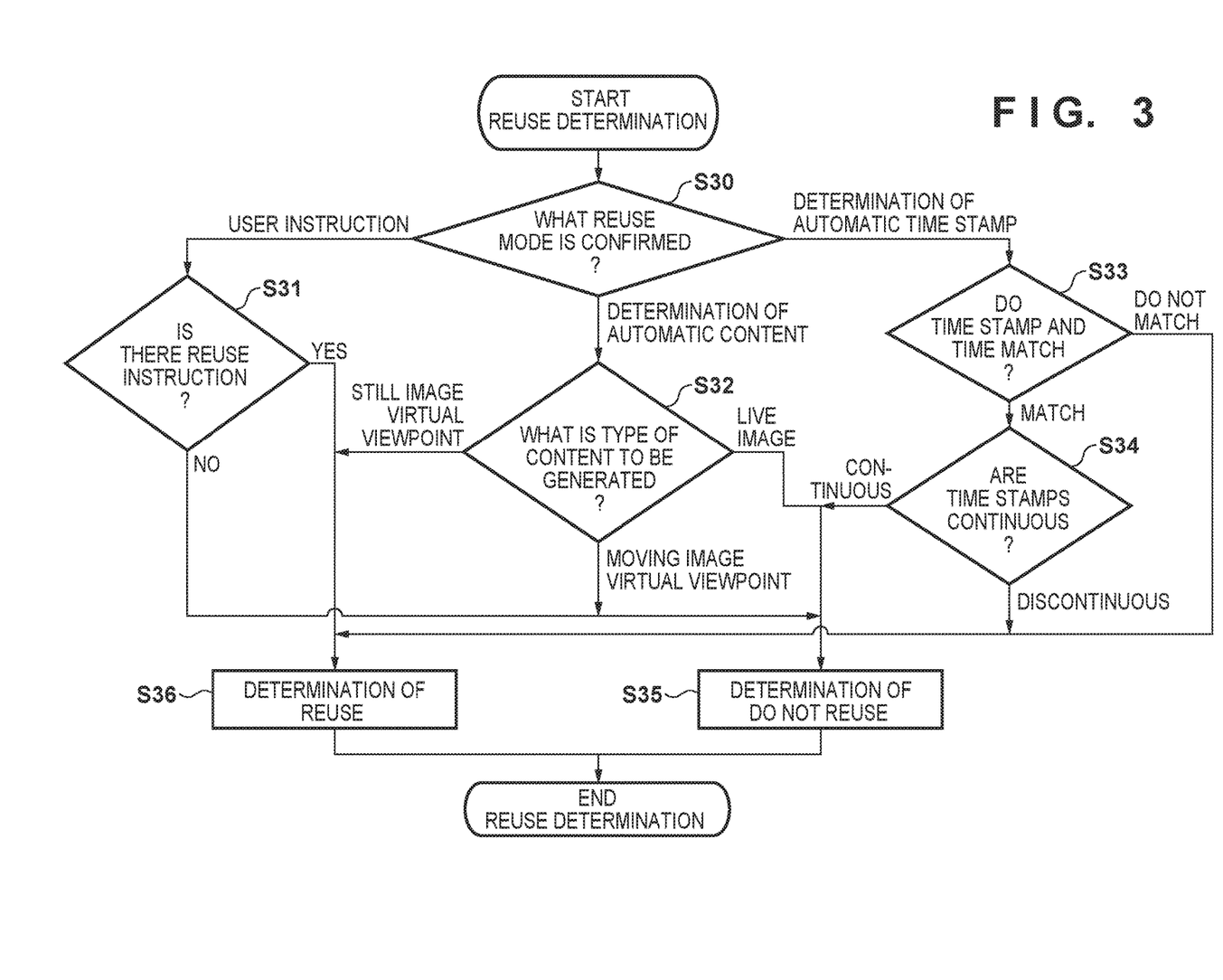
FIG. 3 is a flowchart illustrating processing for determining reuse of audio according to the first embodiment.

Next, description regarding the reuse determination executed in step S24 is given using FIG. 3. The flowchart of FIG. 3 illustrates the details of step S24.

In step S30, the audio control unit 117 confirms what reuse mode that has been set. The reuse mode may be a user instruction mode for determining execution of the above described reuse in accordance with a user instruction or an automatic determination mode for automatically determining execution of the above described reuse based on the image content. The automatic determination mode may be an automatic-content-determination mode in which the audio control unit 117 executes the reuse determination based on the type of image content that is generated or an automatic-time-stamp-determination mode in which the audio control unit 117 executes the reuse determination based on time stamp information of the image content. In the case of the user instruction mode, the processing advances to step S31. In the case of the automatic-content-determination mode, the processing advances to step S32. In the case of the automatic-time-stamp-determination mode, the processing advances to step S33.

In the user instruction mode, it is determined whether or not to execute a reuse of audio data in accordance with an instruction from the user. In step S31, the audio control unit 117 confirms whether or not there is a reuse instruction from the user by obtaining information from the synchronization control unit 116. In a case where there is a reuse instruction from the user, the processing advances in step S36, and in a case where there is no reuse instruction from the user, the processing advances to step S35.

In the automatic-content-determination mode, in a case where it is determined that the image content is a still image from a virtual viewpoint, in other words, in a case where it is determined that the image content is still image virtual-viewpoint content, it is determined that a reuse of the audio data will be executed. In step S32, the audio control unit 117 confirms the type of image content being generated by obtaining information from the synchronization control unit 116. In a case where the image content is still image virtual-viewpoint content, the processing advances to step S36, and in a case where the image content is moving image virtual-viewpoint content or live image content, the processing advances to step S35.

In the automatic-time-stamp-determination mode, it is determined whether or not to execute a reuse of the audio data based on a reproduction time and time stamp of the image data being used in the generation of the image content. In step S33, the audio control unit 117 compares the time stamp of the image data 113 to be used to generate the image content with the reproduction time obtained from the video generation control unit 118. In the case where they do not match, the processing advances to step S36, and the audio control unit 117 determines to reuse the audio data 114. In a case where the compared results match, the processing advances to step S34. Note, the time stamp and the reproduction time generally are not the same values. For example, in FIG. 4, time T0≠time stamp tn0 and time T1≠the time stamp tn1. In the present embodiment, in a case where the difference between the capturing time of the image data corresponding to the image content and the reproduction time of the image content changed, it is determined that a reuse will be performed. For example, the difference between the time T0 and the time stamp tn0 is set as a reference. At the time T1+ΔT, the time stamp of the image data used in the still image virtual-viewpoint content is still tn1, and so the difference between the capturing time of the image data and the reproduction time of the image content changes. In step S33, the change is detected. Also, in a case where monitoring for a change in the difference is resumed in accordance with the end of the standby state (reproduction period elapses) in step S26, the difference between the current reproduction time and the time stamp is set as a reference.

In step S34, the audio control unit 117 obtains the time stamp of the image data 113 to be used to generate the image content from the synchronization control unit 116. Then, it determines whether the time is continuous by comparing it with the time stamp of the image data used in the generation of the image content of the previous reproduction time. In the case where the times are continuous, the processing advances to step S35, and the audio control unit 117 determines to not reuse the audio data 114. In the case where the times are discontinuous, the processing advances to step S36, and the audio control unit 117 determines to reuse the audio data 114.

[Example of Processing Result]

Next, using FIG. 4, a transition of data in a case of determining that the audio data 114 will be reused, and viewing/listening to virtual surround sound content while browsing still image virtual-viewpoint content will be described. FIG. 4 illustrates a case where audio content and image content are reproduced between the time T0 and the time T3.

From the time T0 to the time T1, the live image content generation unit 121 generates the live image content 44, and the live audio content generation unit 123 generates the live audio content 40 and the live audio content 41. These contents are multiplexed in the multiplexing unit 124, and the result is outputted from the image output unit 125 as video content. The time stamps of the image data used to create the live image content 44 are tn0 to tn1. Between T0 and T1, the difference between the time stamp and the reproduction time of the image data used for generating live image content remains as the difference between the time of playback initiation and the time stamp ($\Delta t$=T0−tn0). For this reason, in the automatic-time-stamp-determination mode, it is determined that the audio data will not be reused. Also, the synchronization control unit 116 makes a notification to the audio control unit 117 that live image content is to be generated. Accordingly, in a case of the automatic-content-determination mode, the audio control unit 117 determines that the audio data will not be reused based on this notification.

From the time T1 to the time T2, the still image virtual-viewpoint content generation unit 119 generates still image virtual-viewpoint content 45 and outputs it from the image output unit 125. For example, when the user makes an instruction for a generation of still image virtual-viewpoint content by a predetermined operation at the time T1, a notification of this instruction is made to the image control unit 115 from the video generation control unit 118. The image control unit 115, after receiving this instruction notification, causes the generation of the still image virtual-viewpoint content by the still image virtual-viewpoint content generation unit 119 to start, and causes the generation of the live image by the live image content generation unit 121 to stop. Also, the generation of the audio content is stopped in the live audio content generation unit 123 because there ceases to be audio data used for the generation of the audio content in conjunction with the stoppage of generation of live images.

The audio control unit 117 repeatedly determines whether or not to reuse audio data (step S24). In a case where the reuse mode is for automatic content determination, it is detected that the type of content to be generated became still image virtual-viewpoint content at the time T1, and it is determined that audio data will be reused (step S32 (YES)→step S36). The detection that the content became still image virtual-viewpoint content is made by the audio control unit 117 receiving a notification of the content type from the synchronization control unit 116, for example. Alternatively, configuration may be taken such that the audio control unit 117 determines the content type from metadata of content (image data) that the still image virtual-viewpoint content generation unit 119 outputs. Also, progress of the time stamp of the image data that is used for still image virtual-viewpoint content is stopped, and since it becomes discontinuous (in FIG. 4, it remains as tn1), the difference between the reproduction time and the time stamp of the image data ceases to remain as the above-described $\Delta t$. In a case where the reuse mode is for automatic time stamp determination, it is determined that audio data will be reused upon detection of these situations (that $\Delta t$ changes (step S33) or that time stamp stops advancing (becomes discontinuous) (step S34)).

In a case where it is determined that the audio data will be reused, the audio control unit 117 conveys the start time T1 and the reproduction period ($\Delta T$=T2−T1) together with making an instruction for a start of the generation of the virtual surround sound content to the virtual surround sound content generation unit 122. Also, the audio control unit 117 reads audio data (audio data for which the time stamp is between tn1−$\Delta T$ and tn1) corresponding to reproduction times between T1−$\Delta T$=2T1−T2 and T1 from the storage unit 112, and transfers the result to the virtual surround sound content generation unit 122. The virtual surround sound content generation unit 122, by using the audio data corresponding to the time 2T1−T2 to the time T1, generates audio content (virtual surround sound content) for listening between the time T1 and the time T2 and outputs this to the image output unit 125. Note that in the present embodiment, audio data is selected in order to generate virtual surround sound content based on the virtual-viewpoint position of the still image virtual-viewpoint content. For example, the audio data collected from microphones close to the cameras (viewpoint) providing the image data used at the time when generation of still image virtual-viewpoint content is started (time T1) is used in the generation of the virtual surround sound content. Of course, the selection of the audio data to be used is not limited to this. For example, configuration may be taken to use audio data that was used in the generation of audio content when the reproduction time is between 2T1−T2 and T1.

When insertion of the still image virtual-viewpoint content is ended (when time T2 is reached), the image control unit 115 causes the generation of content by the still image virtual-viewpoint content generation unit 119 to stop, and causes the generation of live image content by the live image content generation unit 121 to resume. In the example of FIG. 4, the generation of the live image content that was interrupted at time T1 when the generation of the still image virtual-viewpoint content was started is resumed. Specifically, the live image content is generated by using image data from time stamp tn1. However, in a case where the viewpoint moved in the still image virtual-viewpoint content, the image data from a camera close to the final position of the viewpoint is used. By doing this, continuity of the images is maintained resulting in a natural reproduced image.

From the time T2 to the time T3, the live image content generation unit 121 generates live image content 46 and outputs it to the multiplexing unit 124. Also, together with this, the live audio content generation unit 123 generates live audio content 43 and outputs it to the multiplexing unit 124. The multiplexing unit 124 multiplexes the live image content 46 and the live audio content 43 into one data sequence to generate video content, and outputs the video content to the image output unit 125. As described above, at a timing (T2) at which the period in which the still image virtual-viewpoint content is reproduced ends, audio content generated by using a sound pickup signal of approximately the same time as the capturing time corresponding to the image content of that timing is reproduced. Specifically, it is possible to listen to continuous audio when switching from the still image virtual-viewpoint content to other content (the live image content in FIG. 4). For this reason, the user can listen to realistic audio without a sense of unnaturalness.

Note, while the generation of still image virtual-viewpoint content is started at the time T1 (arbitrary time) in the present embodiment, it is assumed that ΔT which is the reproduction period is set in advance. The embodiment is not limited to this. For example, configuration may be taken such that the reproduction period can be designated together with an instruction to generate still image virtual-viewpoint content. For example, configuration may be taken such that a button for generating five seconds of still image virtual-viewpoint content, a button for generating ten seconds of still image virtual-viewpoint content, and the like are provided, and the reproduction period ΔT is determined by making an instruction in relation to one of the buttons. Alternatively, in a configuration in which it is possible to cause the still image virtual viewpoint direction to rotate 360 degrees with respect to an object, configuration may be taken such that the time necessary to rotate 360 degrees is set in advance and the reproduction period is set in accordance with the designated amount of rotation. In such a case, when an instruction is made to cause the virtual-viewpoint direction to rotate 180 degrees with respect to an object together with the generation of still image virtual-viewpoint content for example, half of the time required for a rotation of 360 degrees is set as the reproduction period of the still image virtual-viewpoint content.

Also, although audio data of a period of ΔT immediately preceding still image virtual-viewpoint content is used in the reuse of the audio data in the above described embodiment, limitation is not made to this. Configuration may be taken such that audio data of an arbitrary timing prior to a time stamp of the still image virtual-viewpoint content is used from among the audio data 114 stored in the storage unit 112 together with the image data 113. Specifically, configuration may be taken such that reproduced audio content is generated together with still image virtual-viewpoint content by using the audio data collected at a time before a capturing time corresponding to the still image virtual-viewpoint content. However, it is advantageous that audio data of the time 2T1–T2 to the time T1 is used in a case where image content is generated as in FIG. 4. This is because good audio continuity at the time T2 can be achieved thereby.

As described above, by virtue of the first embodiment, a capturing time of image data used for a generation of image content is specified, and audio content is generated for reproduction together with corresponding image content by using audio data based on collection by microphones at a time prior to the capturing time. Accordingly, even in a case where audio data corresponding to images is not present as with still image virtual-viewpoint content, the user can listen to audio. Also, the audio data used for the generation of this audio is audio data related to the image data used for the generation of the video content, and the user can continue to listen without a sense of unnaturalness. In particular, as illustrated in FIG. 4, the continuity of the audio can be improved by using audio data corresponding to a period of the times 2T2–T1 to T1 to generate audio content corresponding to time T1 to T2 which is the reproduction period of the still image virtual-viewpoint content.

Note, although description is given centering on a case where still image virtual-viewpoint content is inserted into image content in the present embodiment, limitation is not made to this. For example, it is possible to apply the above described embodiment even in a case where slow motion moving image virtual-viewpoint content is inserted. Specifically, configuration may be taken such that an audio signal to be reproduced together with moving image virtual-viewpoint content is generated by using an audio collection signal based on audio collection at a time before the capturing time of images used to generate the moving image virtual-viewpoint content. Even in such a case, a sense of unnaturalness in viewing/listening by the user can be reduced similarly to in the above described embodiment.

Second Embodiment

In the first embodiment, description was given of a configuration in which audio data from microphones close to a viewpoint corresponding to when a generation of still image virtual-viewpoint content is started is used to generate audio content when generating the still image virtual-viewpoint content. However, the method of selecting the audio data when generating still image virtual-viewpoint content is not limited to this. In the second embodiment, description regarding a configuration in which audio data is selected based on the position of an object in a case where virtual surround sound content corresponding to still image virtual-viewpoint content is generated. Note, the configurations of the video processing system and the image/audio processing apparatus 100 are the same as in the first embodiment (FIG. 1A and FIG. 1B).

[Example of Installation of Cameras and Microphones in a Stadium]

Figure 5:
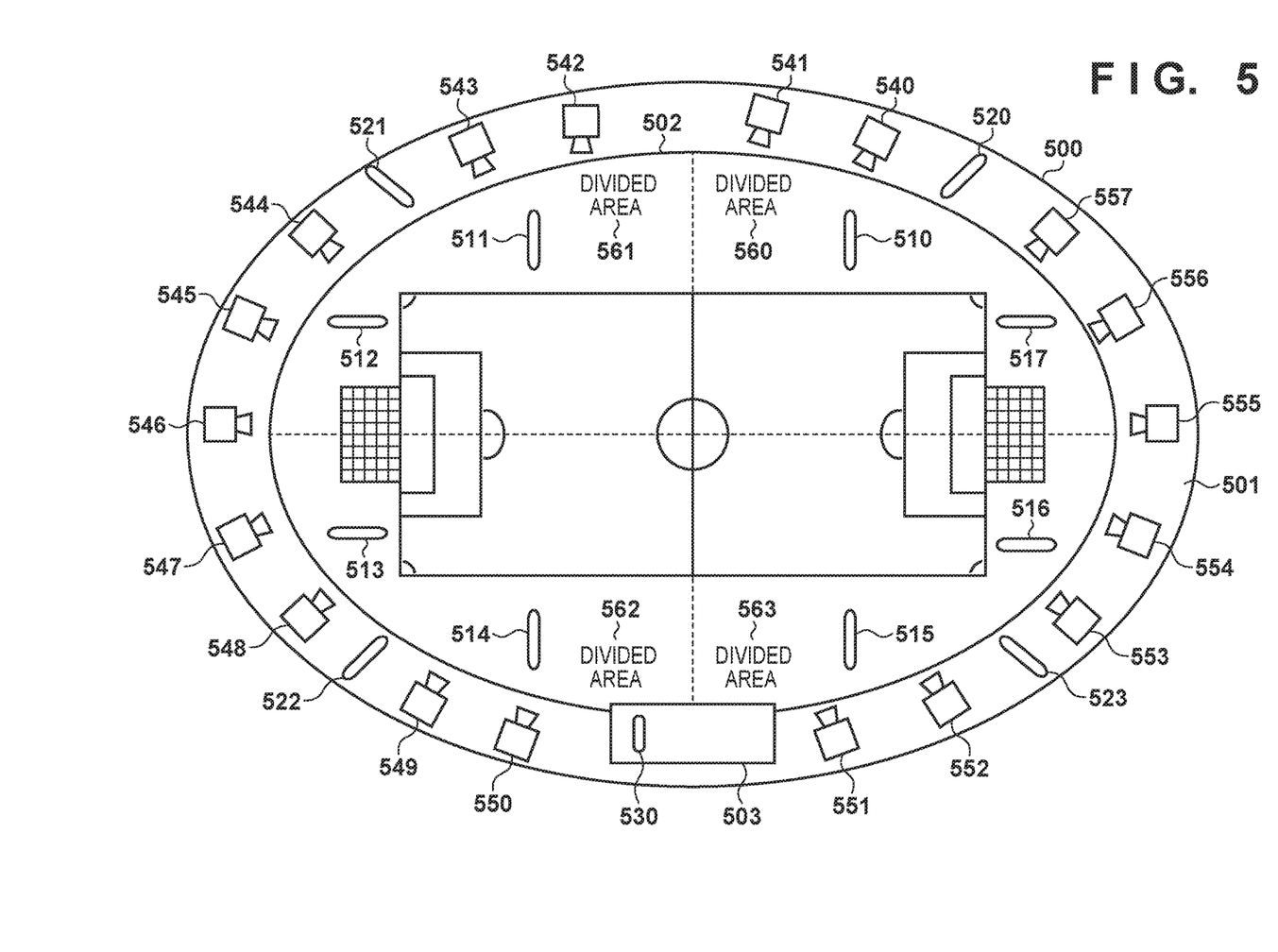
FIG. 5 is a view of an installation of cameras and microphones in a stadium according to a second embodiment.

FIG. 5 is an example of an installation of cameras and microphones in a stadium. A stadium 500 has stands 501, a field 502, and a live room 503. Also, dividing the field 502 into four regions using the dashed lines, a first quadrant is referred to as a divided area 560, a second quadrant is referred to as a divided area 561, a third quadrant is referred to as a divided area 562, and a fourth quadrant is referred to as a divided area 563. Microphones 510 to 517 are microphones installed within the field 502. In the example of FIG. 5, two microphones are installed in each of the divided areas 560 to 563. Microphones 520 to 523 are microphones installed within the stands 501. A microphone 530 is a microphone installed in the live room 503. The microphones 510 to 517 and 520 to 523 configure the microphone group 102. Cameras 540 to 557 are cameras installed in the stands 501. The cameras 540 to 557 configure the camera group 101.

[Configuration of Audio Data]

Figure 6:
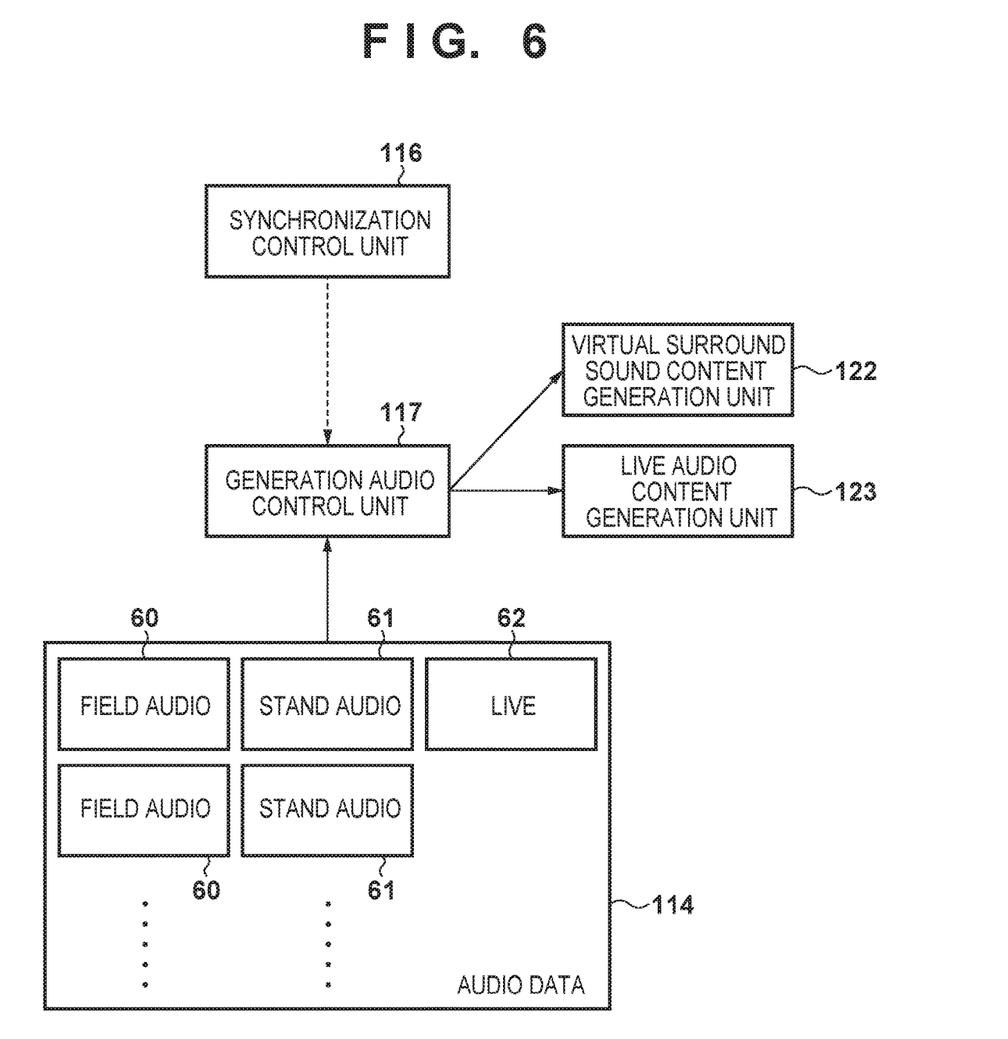
FIG. 6 is a view for describing an example of a data configuration of audio according to the second embodiment.

FIG. 6 is a view illustrating an internal structure of the audio data 114 stored in the storage unit 112. The audio data 114 includes a plurality of categories: field audio 60 that the microphones 510 to 517 collect; stand audio 61 that the microphones 520 to 523 collect; and live audio 62 that the microphone 530 collects. The field audio 60 is audio data collected in the field of the stadium. The stand audio 61 is audio data collected in the stands of the stadium. The live audio 62 is audio data obtained by collecting the audio of a live commentator. The audio control unit 117 selects necessary audio (at least one of the field audio 60, the stand audio 61, and the live audio 62 in the present example) from the audio data 114 based on the time stamp or the viewpoint of the moving image content, and reads it from the storage unit 112. The audio control unit 117 determines a transmission destination of the read audio data in accordance with the type of moving image content being generated from among the virtual surround sound content generation unit 122 and the live audio content generation unit 123. The audio control unit 117 sends the read audio data to a determined content generation unit.

[Operation]

Figure 7:
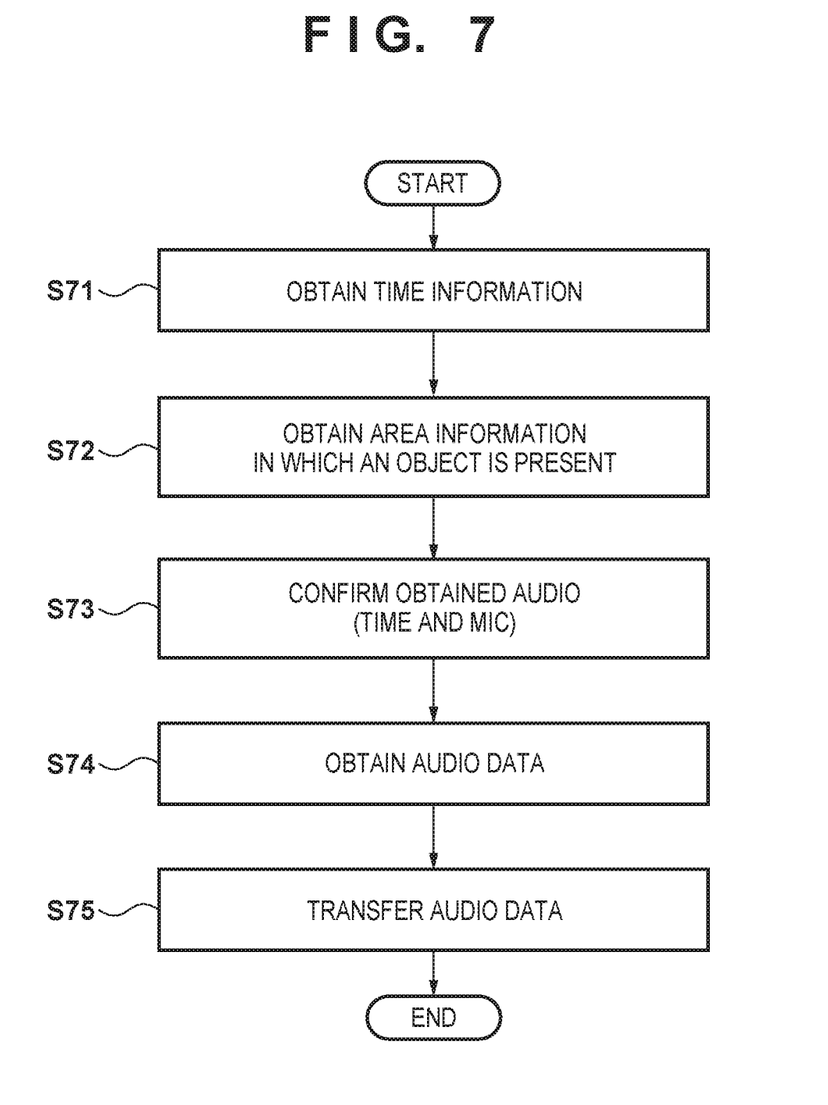
FIG. 7 is a flowchart illustrating processing for selecting audio according to the second embodiment.

Description regarding processing in which the audio control unit 117 selects audio data used for the generation of audio content for still image virtual-viewpoint content from the audio data 114 is given using the flowchart of FIG. 7. The processing illustrated by the flowchart of FIG. 7 is one example of the details of the processing of step S25 and step S26 of FIG. 2.

In step S71, the audio control unit 117 obtains from the synchronization control unit 116 time stamp range information based on a time stamp of image data used to generate still image virtual-viewpoint content and a reproduction period (ΔT of FIG. 4 for example) of the still image virtual-viewpoint content. The time stamp range information is a range of time stamps for obtaining audio data, and is a range of time stamps (tn1−ΔT to tn1) corresponding to the range of "2T1−T2" to "T1" of FIG. 4 for example. In step S72, the audio control unit 117 obtains from the synchronization control unit 116 area information in which an image content object is present. The area information may be two-dimensional or three-dimensional coordinates.

In step S73, the audio control unit 117 determines the audio data to be transferred to the virtual surround sound content generation unit 122 based on the time stamp range information obtained in step S71 and the area information obtained in step S72. For example, audio data of the range indicated in the time stamp range information obtained in step S71 is determined as the audio data to be transferred from among the audio data obtained from the microphones specified based on the area information obtained in step S72. In step S74, the audio control unit 117 obtains the audio data determined in step S73 from among the audio data 114. For example, audio data having time stamps of a range indicated by the time stamp range information obtained in step S71 and collected from the microphones corresponding to the area that the area information obtained in step S72 indicates is obtained. In step S75, the audio control unit 117 transfers the audio data obtained in step S74 to the virtual surround sound content generation unit 122.

[Concrete Example of the Selection of Audio Data]

Hereinafter, an example of processing for selecting audio data by the audio control unit 117 (step S73) is illustrated by using the example of installation in the stadium 500 illustrated in FIG. 5 and the example of the configuration of the audio data 114 illustrated in FIG. 6. It is assumed that the generated image content is still image virtual-viewpoint content, and an object is present in the divided area 561. In the case of still image virtual-viewpoint content, virtual surround sound is generated because there is no corresponding audio data.

For example, the following two types of methods of selecting audio data are given. The first is a method for selecting only the stand audio 61, and the second is a method for selecting only the field audio 60. In the method for selecting only the stand audio 61, audio data whose time stamps are in the range indicated by time stamp range information is selected from among audio data obtained from the microphone 521 corresponding to the divided area 561 in which the object is present. In the method for selecting only the field audio 60, audio data whose time stamps are in the range indicated by time stamp range information is selected from among audio data obtained from the microphones 511 and 512 (but not the microphone 521) which present in the divided area 561. It is assumed that it is determined which selection method is to be employed by a user setting.

Of course, the method of selecting the audio data is not limited to the above. For example, configuration may be taken such that audio content is generated by excluding audio data collected by a microphone at the closest position from the position of the object of the image data used for the generation of image content (still image virtual-viewpoint content). Note, live audio is not made to be the selection target in the present embodiment because discontinuity is noticeable when previous audio data is reused.

As described above, by virtue of the second embodiment, it is possible to select, by a user designation, a method of selecting audio data in a case of generating virtual surround sound for still image virtual-viewpoint content. For this reason, the user can listen to various audio and can experience a sense of presence in various ways when browsing still image virtual-viewpoint content.

Third Embodiment

In the first embodiment, a configuration in which audio data is selected to generate audio content based on the position of a virtual viewpoint is described, and in the second embodiment, a configuration in which audio data is selected to generate audio content based on the position of an object of still image virtual-viewpoint content is described. In the third embodiment, a configuration in which audio content is generated based on a virtual viewpoint of still image virtual-viewpoint content similarly to in the first embodiment is described. However, in the third embodiment, a configuration in which it is possible to switch among a plurality of methods of generating audio content using the position of a virtual viewpoint is described. In particular, description regarding a case where a method for generating virtual surround sound content so that audio in accordance with movement of the virtual viewpoint moves (a rotation for example) is included as one of the generation methods. Note, audio moving means that a virtual audio collection position changes. Note, the configurations of the video processing system and the image/audio processing apparatus 100 are the same as in the first embodiment (FIG. 1A and FIG. 1B).

[Types of Virtual Surround Sound]

In the present embodiment, a configuration in which there are three types of methods for generating virtual surround sound is described. The first generation method, which is a generation method according to a capture coordinate reference, moves the position of audio collection of audio content (rotated) based on movement of the position (hereinafter referred to as capture coordinates) of a camera that captures an object, specifically the virtual viewpoint. In the generation method according to a capture coordinate reference, it is necessary to obtain a plurality of capture coordinates. The second generation method, which is a generation method according to an end reference, generates audio content based on a final capture coordinate of the still image virtual-viewpoint content. The third generation method, which is a generation method according to a start reference, generates audio content based on an initial capture coordinate of the still image virtual-viewpoint content.

Note, in the generation method according to a capture coordinate reference, it is necessary to obtain capture coordinates together with movement of the position of the virtual viewpoint. Also, in the generation method according to the end reference, virtual surround sound content is generated after the final capture coordinates of the still image virtual-viewpoint content are obtained. However, a case in which the movement path of the virtual viewpoint in the generation of the still image virtual-viewpoint content is known in advance, in other words, a plurality of necessary capture coordinates or the final capture coordinates are known in advance, it is possible to immediately obtain the plurality of capture coordinates or the final capture coordinates.

[Operation]

Figure 8:
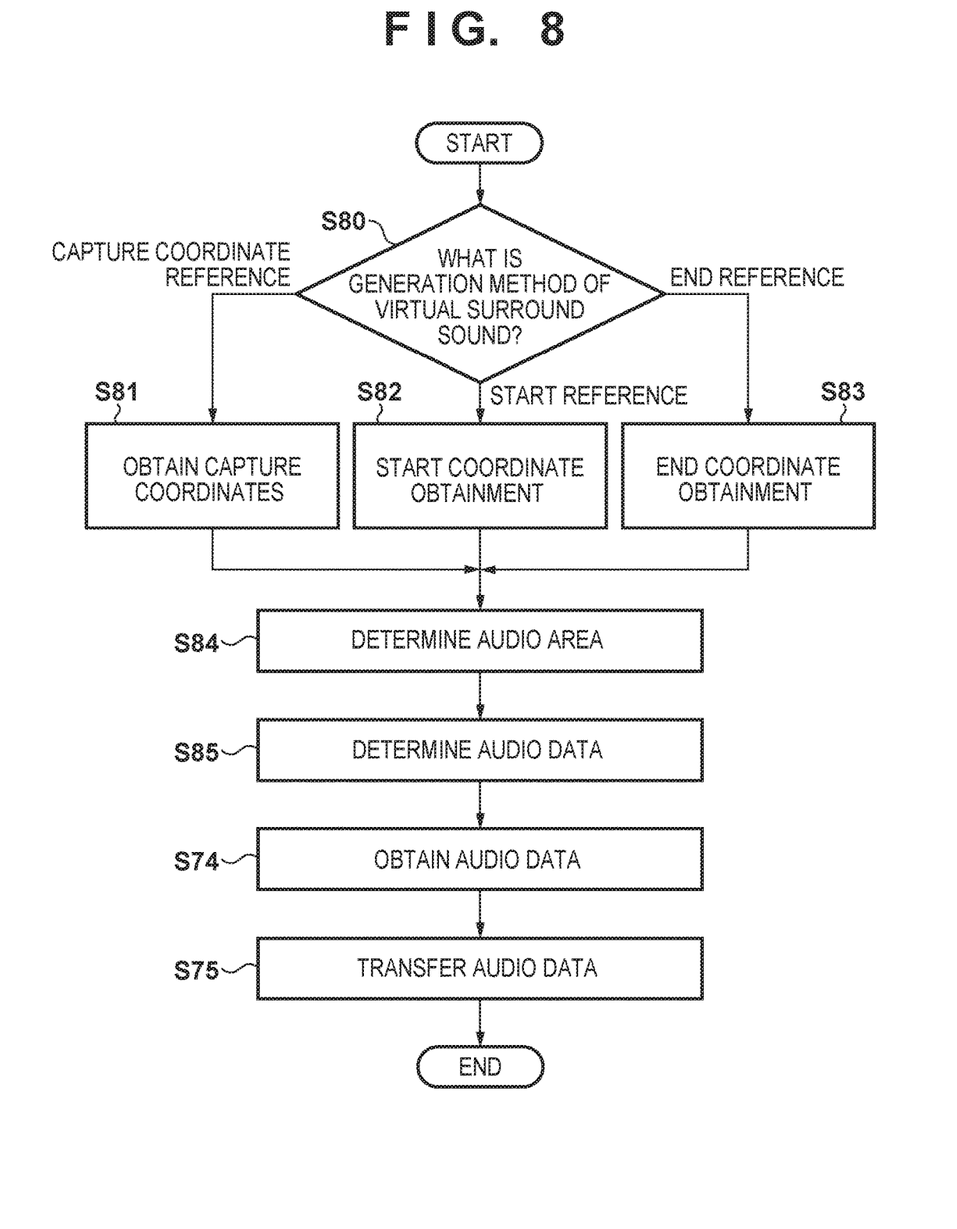
FIG. 8 is a flowchart illustrating processing for selecting audio, from which virtual surround sound is generated, according to a third embodiment.

FIG. 8, according to the third embodiment, is a flowchart illustrating processing for selecting, from among the audio data 114 stored in the storage unit 112, audio data necessary for generating virtual surround sound for still image virtual-viewpoint content.

In step S80, the audio control unit 117 obtains the virtual surround sound generation method designated by the user from the synchronization control unit 116 or the video generation control unit 118. In a case where the designated generation method is the generation method according to capture coordinate reference, the processing advances to step S81, in a case where it is the generation method according to end coordinate reference, the processing advances to step S83, and in a case where it is the generation method according to start coordinate reference, the processing advances to step S82. In step S81, the audio control unit 117 obtains the plurality of capture coordinates of the camera from the synchronization control unit 116. In step S82, the audio control unit 117 obtains the capture coordinate for when the still image virtual-viewpoint content starts from the synchronization control unit 116. In step S83, the audio control unit 117 obtains the capture coordinate for when the virtual-viewpoint content ends from the synchronization control unit 116.

After step S81-step S83, the processing advances to step S84. In step S84, the audio control unit 117 selects a divided area based on the capture coordinates obtained in step S81, step S82, or step S83. For example, the divided area in which the capture coordinates are present is selected from among the divided areas 560 to 563 illustrated in FIG. 5. A divided area in which a microphone necessary for generation of virtual surround sound is present is determined. In place of selecting a divided area, a configuration in which a microphone is selected may be employed.

In step S85, the audio control unit 117 determines a microphone from the divided area selected in step S84, and determines the audio data to be used. The processing of step S74 and step S75 is as described in FIG. 7. In the case of the generation method according to capture coordinate reference, a plurality of pieces of audio data corresponding to the plurality of capture coordinates are transmitted to the virtual surround sound content generation unit 122, and the virtual surround sound content generation unit 122 generates audio content that moves in accordance with the movement of the virtual viewpoint. In a case of the generation method according to start reference, audio data corresponding to a start coordinate is transferred to the virtual surround sound content generation unit 122, and the virtual surround sound content generation unit 122 processes the audio data and generates audio content. For example, processing is performed such that sound is muffled as time elapses. In a case of the generation method according to end reference, audio data corresponding to an end coordinate is transferred to the virtual surround sound content generation unit 122, and the virtual surround sound content generation unit 122 processes the audio data and generates audio content. For example, conversely to the case of the generation method according to start reference, processing is performed so as to the transition from a muffled sound to a sharp sound as time elapses.

As described above, in the present embodiment, it is possible to determine input audio for generating virtual surround sound in accordance with virtual-viewpoint content, and provide the user with an improved sense of presence by rotating the audio similarly to the virtual viewpoint. Also, by providing a plurality of reference coordinates, it is possible to leave room for the user to select among a variety of senses of presence.

Note, although a configuration in which generation of image content and generation of audio content is performed substantially in parallel is described in each of the foregoing embodiments, limitation is not made to this. Even in the case of processing for generating audio content that is attached later in relation to image content generated in advance, such as in a situation in which the image content of T1 to T3 in FIG. 4 is generated in advance, for example, it is possible to apply the above-described audio content generation. Also, in a case where the reuse mode is a user instruction mode, reuse of audio content is executed irrespective of the type of image content. For example, in a case where there was a reuse instruction from the user during the generation of live image content, audio content using previous audio data over a period (reproduction period) determined beforehand is generated immediately after this instruction is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-233499, filed Nov. 30, 2016 which is hereby incorporated by reference herein in its entirety.

What is claimed is:

1. A signal processing apparatus, comprising:
at least one hardware processor; and
a memory which stores instructions executable by the at least one hardware processor to cause the signal processing apparatus to perform at least:
  acquiring information related to a capturing point of time corresponding to a virtual-viewpoint image generated based on a plurality of captured images that are captured from respectively different directions by a plurality of cameras;
  identifying a length of a playback period of the virtual-viewpoint image;
  obtaining a collected sound signal based on collection of sound of a sound collection region by at least one microphone, wherein the sound collection region includes at least a part of a capturing area captured by the plurality of cameras; and
  generating an audio signal to be reproduced together with the virtual-viewpoint image in the playback period, by using the obtained collected sound signal corresponding to a sound collection period determined based on both the capturing point of time specified by the acquired information and the identified length of the playback period,
wherein a sound collection point of time corresponding to the audio signal at a beginning of the playback period is earlier than the capturing point of time corresponding to the virtual-viewpoint image.

2. The signal processing apparatus according to claim 1, wherein the instructions further cause the signal processing apparatus to perform:
  executing control to cause the generated audio signal to be reproduced together with the virtual-viewpoint image.

3. The signal processing apparatus according to claim 1, wherein the instructions further cause the signal processing apparatus to perform:
  determining the sound collection period based on the capturing point of time specified by the acquired information and the identified length of the playback period.

4. The signal processing apparatus according to claim 1, wherein the instructions further cause the signal processing apparatus to perform:
  generating audio content which is reproduced together with image content including a period in which the virtual-viewpoint image is reproduced and a period in which a captured image captured by a camera is reproduced, the audio content including the generated audio signal.

5. The signal processing apparatus according to claim 1, wherein
  the virtual-viewpoint image is a moving image generated based on the plurality of captured images captured by the plurality of cameras at a single capturing point of time, and wherein
  a virtual viewpoint corresponding to the virtual-viewpoint image changes over the playback period.

6. The signal processing apparatus according to claim 1, wherein
  the information related to the capturing point of time includes a time stamp of the virtual-viewpoint image.

7. The signal processing apparatus according to claim 4, wherein, in a case where the period corresponding to the virtual-viewpoint image in the image content is from T1 to T2, the audio signal which is to be reproduced in the period from T1 to T2 is generated by using a collected sound signal that is the same as the sound signal to be used to generate an audio signal to be reproduced in the period from 2T1−T2 to T1.

8. The signal processing apparatus according to claim 1, wherein the instructions further cause the signal processing apparatus to perform:
  accepting input of image content, wherein
  in a case where the accepted image content includes a virtual-viewpoint image which is a moving image corresponding to a single capturing point of time, the audio signal is generated by using a collected sound signal based on collection by the microphone at a point in time before the single capturing point of time.

9. The signal processing apparatus according to claim 4, wherein the instructions further cause the signal processing apparatus to perform:
  accepting input of image content, wherein
  in a case where a capturing point of time corresponding to the captured image included in the accepted image content and a capturing point of time corresponding to the virtual-viewpoint image included in the image content are discontinuous, the audio signal is generated by using collected sound signal based on collection by the microphone at a point in time before the capturing point of time corresponding to the virtual-viewpoint image.

10. The signal processing apparatus according to claim 1, wherein the instructions further cause the signal processing apparatus to perform:
  accepting input of image content, wherein
  in a case where a difference between a reproduction time of the accepted image content and a capturing point of time of a captured image to be used for generation of the image content changes within a period of the image content, the audio signal is generated by using a collected sound signal based on collection by the microphone at a point in time before the capturing point of time.

11. The signal processing apparatus according to claim 1, wherein
  a sound collection point of time corresponding to the audio signal at an end of the playback period is substantially the same as the capturing point of time corresponding to the virtual-viewpoint image.

12. The signal processing apparatus according to claim 1, wherein the virtual-viewpoint image is a slow motion moving image.

13. The signal processing apparatus according to claim 1, wherein
  in the generating, the audio signal is generated by using the obtained collected sound signal based on collection by a microphone determined based on a position of a virtual viewpoint corresponding to the virtual-viewpoint image.

14. The signal processing apparatus according to claim 1, wherein
  in the generating, the audio signal is generated by using the obtained collected sound signal based on collection by a microphone determined based on a position of an object included in the plurality of captured images.

15. The signal processing apparatus according to claim 1, wherein the obtained collection sound signal includes both field audio in which a sound of a field of a stadium is and stand audio in which a sound of stands of the stadium and in the generating the audio signal is generated by using the stand audio.

16. The signal processing apparatus according to claim 1, wherein
in the generating, the audio signal corresponding to a collection position that changes in accordance with movement of a virtual viewpoint corresponding to the virtual-viewpoint image is generated.

17. The signal processing apparatus according to claim 1, wherein
in the generating, the audio signal according to a position of a virtual viewpoint corresponding to the virtual-viewpoint image at the beginning of the playback period is generated.

18. The signal processing apparatus according to claim 1, wherein
in the generating, the audio signal according to a position of a virtual viewpoint correspond to the virtual-viewpoint image at the end of the playback period is generated.

19. A method of generating an audio signal, comprising:
acquiring information related to a capturing point of time corresponding to a virtual-viewpoint image generate based on a plurality of captured images that are captured from respectively different directions by a plurality of cameras;
identifying a length of a playback period of the virtual-viewpoint image;
obtaining collected sound signal based on collection of a sound collection region by at least one microphone, wherein the sound collection region includes at least a part of a capturing area captured by the plurality of cameras; and
generating an audio signal to be reproduced together with the virtual-viewpoint image in the playback period, by using the obtained collected sound signal corresponding to a sound collection period determined based on both the capturing point of time specified by the acquired information and the identified length of the playback period, wherein a sound collection point of time corresponding to the audio signal at a beginning of the playback period is earlier than the capturing point of time corresponding to the virtual-viewpoint image.

20. A non-transitory computer-readable storage medium storing a program for causing a computer to execute a method of generating an audio signal, the method comprising:
acquiring information related to a capturing point of time corresponding to a virtual-viewpoint image generated based on a plurality of captured images that are captured from respectively different directions by a plurality of cameras;
obtaining collection collected sound signal based on collection of sound of a sound collection region by at least one microphone, wherein the sound collection region includes at least a part of a capturing area captured by the plurality of cameras; and
generating an audio signal to be reproduced together with the virtual-viewpoint image in the playback period, by using the obtained collected sound signal corresponding to a sound collection period determined based on both the capturing point of time specified by the acquired information and the identified length of the playback period, wherein a sound collection point of time corresponding to the audio signal at a beginning of the playback period is earlier than the capturing point of time corresponding to the virtual-viewpoint image.

* * * * *